March 21, 1961  A. G. BODINE, JR  2,975,846
ACOUSTIC METHOD AND APPARATUS FOR DRIVING PILES
Filed March 8, 1957  3 Sheets-Sheet 2
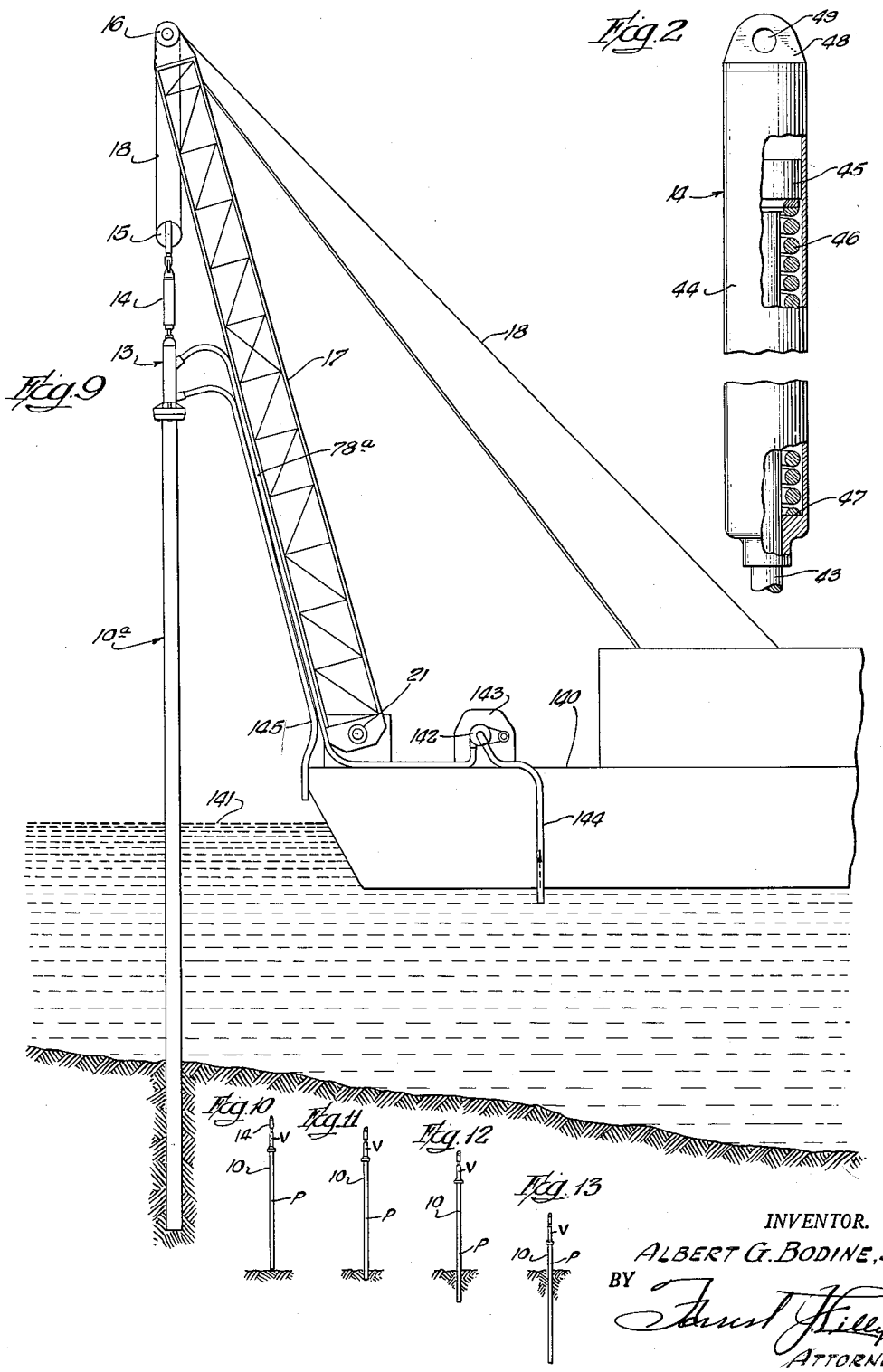
INVENTOR.
ALBERT G. BODINE, JR.
BY
ATTORNEY.

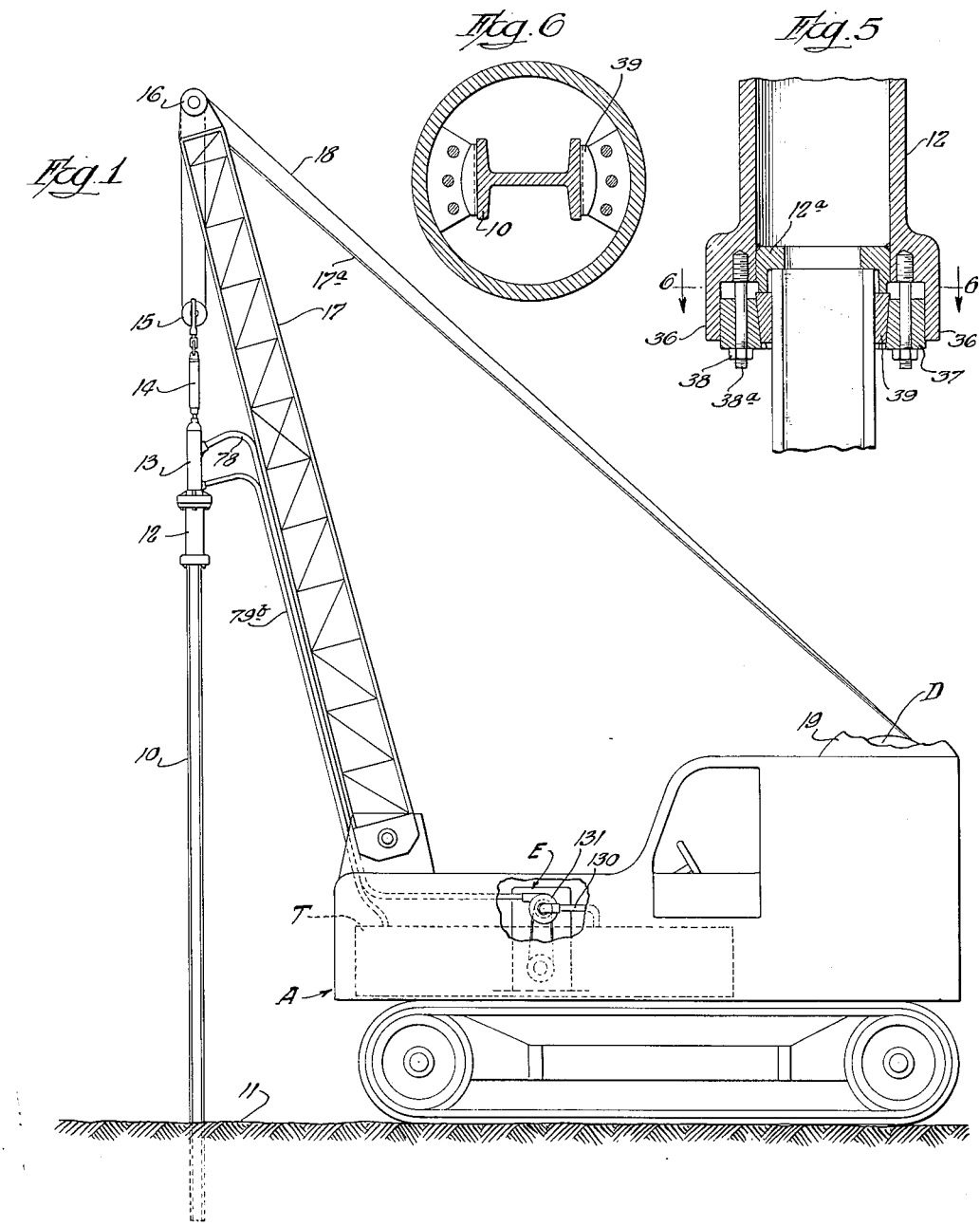

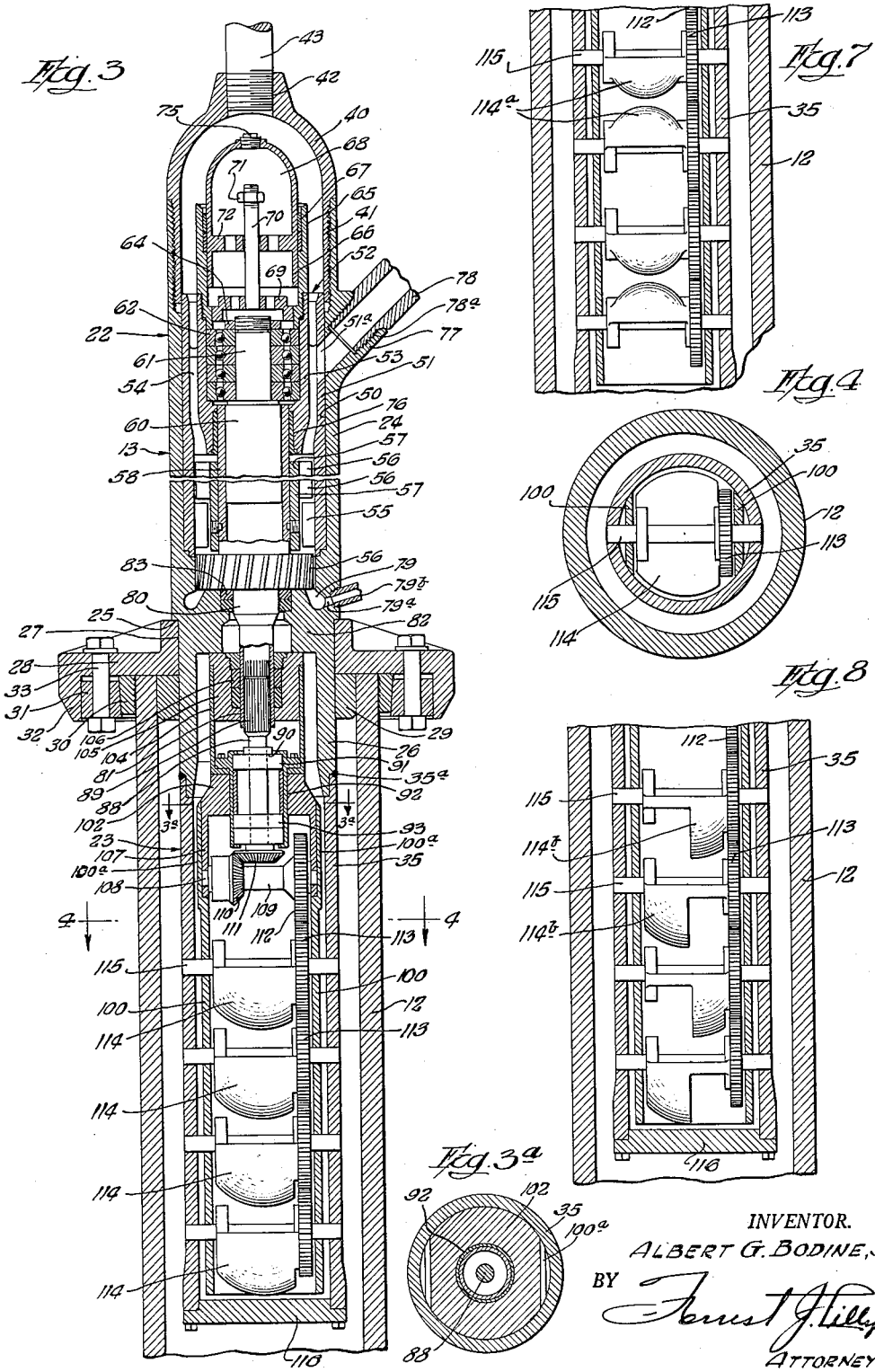

2,975,846
ACOUSTIC METHOD AND APPARATUS FOR DRIVING PILES

Albert G. Bodine, Jr., 13120 Moorpark St., Van Nuys, Calif.

Filed Mar. 8, 1957, Ser. No. 644,774

13 Claims. (Cl. 175—19)

This invention deals generally with methods and apparatus for driving piles, such as are used for building or other structural foundations, and is applicable to pile driving either into dry-surface earth, into marsh or tidewater ground, or in underwater situations. The piles in contemplation are those conveniently used, typically, steel H-section members, members of corrugated section, tubular section, or any other, and composed of steel, wood, pre-stressed concrete, plastic, etc.

Conventional pile drivers operate by hammering on the top of the pile, or by applying a forced vibration to the pile as a whole. One main disadvantage to these known methods stems from the inherent fact that the pile presents an inertia or mass reactance which tends to counteract the driving force. The driving force is needed at the bottom of the pile in order to force the pile through the earth. Any uncompensated inertia reactance from the pile itself is a waster of force, subtracting from the applied energy before this energy can do its work at the bottom of the pile.

A primary object of the present invention is the provision of an effective sonic wave method of an apparatus for driving piles, wherein the inertia factor is eliminated as a deterrent to driving action.

I have discovered that by utilizing the elastic property characteristic of most piles, and by generating a sonic (elastic) resonant standing wave pattern in the pile, I can use the mass reactance of the pile to an advantage rather than a disadvantage. Basically I accomplish this by utilizing the elastic stiffness reactance of the pile structure for the purpose of counterbalancing the mass reactance. This I accomplish by establishing a standing wave pattern whereby a dynamic storage of energy is accomplished in a system characterized by a dynamic balance between mass reactance and capacitive stiffness.

According to one practice of my invention, I generate a comparatively large amplitude longitudinal sonic standing wave in the pile, using a sonic wave generator whose output impedance is well adjusted to that of the pile when considered as a sound wave transmission medium. I couple this sonic wave generator effectively to the upper end of the pile, using a stiff, preferably substantially rigid, coupling means between the two. In operation, the high impedance wave generator, stiffly coupled to the high impedance pile, delivers a large amount of cyclic force energy to the pile, and establishes a large amplitude, or high energy, standing wave therein.

Under these conditions the pile becomes, in effect, a flywheel into which a large amount of the energy is stored throughout most of the sonic cycle, this energy being alternatively stored and delivered from both the moving mass and elastically deformed structure of the pile. The energy thus stored is available for each momentary downward impact of the pile bottom against the earth. When a standing wave is established in the pile, and before the pile is effectively "started," or engaged with the earth, the upper and lower ends of the pile become the locations of velocity antinodes, which are regions of maximum vibratory velocity amplitude along the pile. One or more additional velocity antinodes may appear along the pile, depending upon the frequency of the generator with reference to the length of the pile; and between each pair of adjacent velocity antinodes is a pressure antinode, which is a region of minimum or zero velocity amplitude, and of maximum cyclic stress amplitude. Generally, however, the generator frequency is adjusted to a frequency such that a half wavelength standing wave is established at the outset, with a velocity antinode at each end, and a pressure antinode at the midpoint. The pile under such conditions vibrates as a "free-free" bar, using the common language of the acoustic art. The pile has no "bodily" vibratory movement. Each half length alternately elongates and contracts, the amplitude of elongation progressively increasing from the midpoint to each end, and the alternate elongations and contractions occurring in step with one another, so that dynamic balance is preserved. As the pile is started, the lower end of the pile thus impacts vertically against the soil at the frequency of the standing wave. The force of the impact, as alluded to hereinabove, is dependent upon the energy stored in the pile owing to the acoustic standing wave system, and assuming a powerful, high impedance sonic wave generator, stiffly coupled to the upper end of the pile, the energy flow from the generator into the standing wave system is large, and a large reservoir of energy is thus available within the pile and assures a large impacting force against the earth. The pile is thus rapidly started downward into the earth. The compressional loading by the weight of the sonic wave generator and its motor drive means, plus the weight of the pile itself, biases the pile in a downward direction, and causes the pile to settle in the earth as successive impacts cause the soil or rock to give way.

Once the pile is started into the earth, its lower end is no longer entirely "free," and the amplitude of vibratory motion at the lower end is materially reduced, with pressure amplitude correspondingly increased. The pressure antinode at the midpoint moves somewhat downward along the pile, approaching, though never reaching, the ground surface. The distance from the upper velocity antinode to the pressure antinode is thus increased. This denotes a lower resonant vibration frequency, and it is thus necessary that the wave generator be operated at a lower and lower frequency, following the decreasing natural frequency of the embedded pile. This may be accomplished either automatically, or by manual regulation, as will hereinafter be described. This performance proceeds until a sufficient amount of the pile is driven into the earth to establish the maximum acoustic impedance value near the earth's surface, which will determine the maximum down shift of the pressure antinode; thereafter, as the pile is further driven down, and its above-ground length is further shortened, the distance between the velocity antinode at the top and the pressure antinode near the ground surface begins to shorten. At this time, the resonant frequency of the above-ground length of the pile begins to increase, and continues to increase as the pile is further buried. Accordingly, in this final phase, the frequency of the wave generator is correspondingly increased, accomplished again either automatically, or manually. At the end, the frequency is generally higher than at the outset, when the pile operates as a half wavelength, free-free bar.

In some instances it is found desirable to "stab" the pile into the earth, such as by allowing it to drop some distance by releasing the crane cable, before turning on the sonic wave generator. Then when the wave generator is turned on, it is starting with an acoustically damped load; and the above described initial drop in resonant frequency is sometimes hardly noticeable.

A great number of advantages flow from this system, including great driving force, capability of driving long piles, reduction of wall skin friction, compact and easily handled driving machinery, and in addition, a simple means by which the pile can be extracted if desired, extraction being an available reversible process obtained by merely exerting an upward tension on the sonically activated pile. The wave generator can be readily adjusted in frequency so as to generate a standing wave pattern which is desirably related to the dimensions of the pile, and can be readily adjusted to short or long piles. Attainment of the desired wave pattern is easily observed by the facility or rate of penetration of the pile itself. The wave action in the pile greatly reduces wall skin friction, which is highly advantageous in that in ordinary pile driving, skin friction represents a substantial opposition to downward movement of the pile, and subtracts substantially from the energy output of conventional pile driving systems.

The present system takes advantage of a phenomenon known as Poisson's Ratio, which refers to the fact that an elastic expansion or elongation in one direction in an elastic member causes a compensating elastic dilation in another direction. Thus, if longitudinal, or torsional, waves are generated in an elongated elastic pile, a corresponding vibratory change in cross section takes place. This causes the walls of the pile to vibrate laterally against the walls of the surrounding earth, and since this takes place at fairly high sonic vibration frequencies, at which the earth does not respond, the earth literally stands back, providing a small clearance between it and the surface of the pile.

While I have described the invention above as making use of longitudinal vibrations, in some forms of my invention I apply other wave patterns such as lateral, torsional or gyratory modes of wave generation to the pile, which modes cause a loosening effect in the soil, and are advantageous in unstable soils. The driving action at the bottom of the pile in these instances is due to a rocking or transverse action of the bottom face of the pile in response to the wave.

The invention will be further disclosed in connection with the accompanying drawings showing certain present illustrative embodiments thereof, and in which:

Fig. 1 is a schematic elevational view of a pile driving system in accordance with the invention;

Fig. 2 is an elevational view, with parts broken away to show underlying parts in section, of a suspension device taken from Fig. 1;

Fig. 3 is a vertical longitudinal section of the turbine driven sonic wave generator coupled to the upper end of the pile;

Fig. 3a is a transverse section taken on line 3a—3a of Fig. 3;

Fig. 4 is a transverse section taken of the line 4—4 of Fig. 3;

Fig. 5 is a detail in longitudinal section of a coupling between the adapter carried by the wave generator, and the pile;

Fig. 6 is a transverse section taken on line 6—6 of Fig. 5;

Fig. 7 is a view similar to a portion of Fig. 3, but showing a modification;

Fig. 8 is a view similar to Fig. 5, but showing another modification;

Fig. 9 shows an underwater application of the invention; and

Figs. 10, 11, 12 and 13 are diagrams of a pile being driven progressively into the ground in accordance with the invention, and showing locations of velocity and pressure antinodes of the wave pattern in successive stages of the operation.

With reference first to Fig. 1, showing a typical application of the invention, numeral 10 designates generally a conventional H-section steel pile being driven into the earth 11.

In passing, it should be mentioned that while I illustrate an H-section steel pile, the invention is not limited either to the material of the pile or to any particular cross sectional configuration. Thus, the invention is applicable to any pile made of elastic material capable of elastic standing wave action, and may accordingly be constructed of any elastic metal, wood, plastic, or prestressed concrete. With regard to the cross sectional configuration, the pile may have any conventional or desired cross section, such as H-section, corrugated tubular, or solid. The present illustrative embodiment shows specific arrangements for coupling the wave generator to an H-section pile, but will be readily understood by those skilled in the art how, by use of suitable adapters, or clamps, the wave generator may be properly coupled to the upper end of any form of pile.

The pile is shown suspended through adapter 12 from motor-generator 13, shown as hung from a spring suspension device 14, which is in turn supported by a block 15 connected to the upper end of device 14, an upper block 16 mounted on the upper end of a crane 17 privately carried by a transport vehicle A, and a suspension cable 18 reeved around blocks 15 and 16 and led thence to a suitable hoisting drum D contained within drum housing 19 on vehicle A. Crane 17 is shown supported by a cable 17a, which may be wound in a drum, not shown, immediately beyond drum D.

With reference now to Figs. 3 and 5, the motor generator 13 comprises a motor, illustratively and preferably a turbine, generally designated by numeral 22, and a wave generator unit, generally designated by numeral 23, driven by the motor, which will hereinafter be referred to as the turbine. Turbine 22 comprises a tubular case 24, reduced toward its lower end to form an annular downwardly facing shoulder 25 and a reduced lower portion 26 which is tightly fitted within the central bore 27 of a mounting flange 28, the portion 26 projecting somewhat below flange 28, and a ring 29 being tightly fitted thereon immediately below and in engagement with flange 28, as shown. The upper end of a sleeve-like adapter 12, to which the pile 10 is coupled, slides upwardly over ring 29 into engagement with flange 28, and is secured tightly in position against the flange by means of serrated wedge slips 30 compressed inwardly by a wedge ring 31. This wedge ring 31 fits inside a downwardly projecting annular flange 32 on the periphery of flange 28, and is drawn upwardly to wedge the slips 30 inwardly into clamping engagement with the member 12 by means of screws 33 extending through flange 28 and the ring 31. In the event that a tubular type pile is to be driven, the adapter may be omitted, and the tubular pile mounted to flange 28 and the turbine housing in the same way as the adapter sleeve here shown.

Wave generator 23 includes an external cylindrical housing 35 welded to the lower end of turbine housing portion 26, as at 35a and it will be seen that the turbine housing, wave generator housing, and the adapter 12 are thus rigidly interconnected. The lower end of adapter 12 (see Figs. 5 and 6) is in turn rigidly coupled to the upper end of pile 10. As here shown, adapter 12 has a bell 36 at its lower end, within which wedge ring segments 37 are received, and are drawn upwardly by nuts 38 on studs 38a into the lower end of the adapter. These wedge ring segments support the arcuate outer faces of serrated wedge slips 39, which in turn engage opposed flanges 10a of H-section pile 10, introduced into the bell end of the adapter. The upper end of the pile, and the upper edges of wedge slips 39, engage shoulders on a stop ring 12a welded within the lower end of the adapter sleeve. It will be seen that the wedge slips 39 are wedged inwardly to rigidly grip the flanges of the pile when ring segments 37 are drawn tightly up.

The housing for the turbine is completed at the upper end by a cap 40 screw threaded to the upper end of housing 24, as at 41, and furnished at the top with a screw threaded socket 42 receiving the lower screw threaded end of a suspension rod 43. This rod 43 (see Fig. 2) protrudes from the cylindrical case 44 of suspension means 14, and has at its upper end an enlarged head 45 slidable inside case 44 and supported on the upper end of a coil compression spring 46 seated at its lower end on upwardly facing shoulder 47 at the bottom end of case 44. The upper end of case 44 is provided with a bracket 48 formed with an eye 49 for connection of block 15.

Snugly received inside turbine case bore 50 is the outer sleeve member 51 of a spider 52, which includes also an inner sleeve member 53 annularly spaced inside sleeve 51, and connected thereto by means of webs such as indicated at 54. Thus, fluid spaces extend vertically between the inner and outer sleeves of this spider. The outer sleeve 51 extends on downward a substantial distance below the lower end of inner sleeve 53 and serves as a mounting sleeve for vertically spaced sets of turbine stator blades 55. Although but one such set of stator blades 55 appears in Fig. 3, it will be understood that in practice, a number of such sets may be provided, the remainder sets not appearing in Fig. 3 because of the broken out section.

Alternating with the sets of stator blades 55 are sets of turbine rotor blades 56, formed on sleeve 57 tightly mounted on hollow turbine shaft 58, the lowermost being on the shaft 58, as clearly shown. The turbine blades may be conventional, and further detailed illustration or description will accordingly not be necessary. As stated, there may be a number of alternating turbine stator and rotor blade units, as required.

The aforementioned hollow turbine shaft 58 is tightly mounted on a solid turbine shaft 60, which has an upper reduced section 61 supported by the inner race rings of thrust bearings 62 fitted inside sleeve 53, a nut 64 threaded on the upper extremity of shaft section 61 securing the inner race rings of the bearings in assembly. An oil cylinder 65 is reduced and screw threaded at its lower end into the upper end of sleeve 53, and engages and secures the outer race rings of the bearings 62.

Telescopically receivable within oil cylinder 65 is a cylindrical chamber member 66, suitable packing being provided at 67 to prevent leakage of oil contained with the expansive and contractive enclosure 68 thus provided. A perforate spider 69 mounted in the lower end portion of cylinder 66 carries an upwardly extending stem 70 having threaded on its upper end a stop nut 71, and the chamber member 66 has a perforate spider 72 extending thereacross and centrally bored for passage of the stem 70. Oil is initially poured inside the oil cylinder 65 through a filler opening in the top of cylinder 66, normally closed by a plug 75. This oil lubricates the bearings 62. Seals 76 are placed between the upper end of turbine shaft 58 and the lower end portion of sleeve 53. The purpose of the telescopic arrangement of the chamber 66 within the cylinder 65 is to provide for expansion of the oil body within the apparatus with temperature rise during operation, and also to place the lubricant inside the chamber and bearing system under a slight pressure during operating conditions, as will be explained hereinafter, whereby any leakage that occurs will be outwardly of the oil containing system.

The side wall of turbine case 24 is formed, at a point above the turbine blades, with a fluid inlet fitting 77, to which a liquid supply hose 78 is coupled, as at 78a, and sleeve 51 is ported, as at 51a, opposite this inlet, whereby turbine drive liquid may be supplied to the annular space between sleeves 51 and 53. This liquid flows downwardly to and through the successive turbine rotor and stator blades, driving the turbine shaft. Below the turbine blades, the liquid is received in an annular channel 79, to be discharged via outlet port 79a, to which is coupled return hose 79b.

Hollow turbine shaft 58 is reduced below the lowermost set of turbine blades, as at 80, and is then further reduced and formed as an internally splined tubular member 81, which drives the presently mentioned generator shaft. The walls of turbine case 24 are thickened below the lowermost set of turbine blades, as indicated at 82, and formed with a cup to receive packing 83 around the shaft section 80.

The aforementioned wave generator 23 has a vertical drive shaft 88, including an upper section 89 splined within the reduced lowermost tubular section 81 of the turbine shaft, and thus driven by the latter.

The shaft 88 has a downwardly facing shoulder 90 supported by a thrust bearing 91 mounted within the upper end of a bearing housing 92, in the lower end of which are radial bearings 93 for the shaft. Two parallel vertical cheek plates 100 are welded along their longitudinal edges to the inside surface of turbine housing 35, and extend substantially from the top to the bottom of housing 35. A supporting head 102 extends across housing 35 between upper reduced thickness portions 100a of the cheek plates, and is welded to housing 35 and to the cheek plates. This head 102 is centrally bored to receive bearing housing 92, and the latter is flanged at the top for support by said head, as shown. Between the flange of the bearing housing and the head 102 is located an inwardly turned mounting flange on the lower end of a sleeve 104 that supports a head 105 in which is mounted packing 106 for turbine shaft portion 81.

Head 102 is formed with depending mounting plates 107 filled snugly between cheek plate portions 100a. These plates 107 carry a transverse shaft 108 on which is rotatively mounted a gear sleeve 109 provided with a bevel gear 110, with which is meshed a bevel gear 111 on the lower end of generator driver shaft 88, so that the gear sleeve is driven by shaft 88. Gear sleeve 109 also carries a spur gear 112, which meshes with a spur gear 113 on the upper of a series of eccentrically weighted rotors 114 mounted in vertically spaced relation between cheek plates 100. Each rotor 114 has such a spur gear 113, and each such gear 113 meshes with the gear 113 next below, as shown. Each rotor 114 is rotatably mounted on a horizontal axle shaft 115 extending through cheek plates 100 and mounted tightly in the sidewall of housing 35. The rotors consist essentially of unbalanced inertia weights, located to the side of the shafts 115. The several rotors are all arranged so that their unbalanced weights move up and down in unison, which is accomplished if, for instance, they are all initially positioned with their weights at the bottom, as in Fig. 3. The housing 35 is closed at the bottom by a closure 116, and a quantity of oil placed inside the enclosure is splashed upwards by the revolving rotors and lubricates the various bearings of the generator.

As will be evident, each eccentrically weighted rotor exerts a thrust on its mounting shaft 115 as it rotates thereabout. Assuming a longitudinal mode of vibration to be desired, only the thrust in the vertical or longitudinal direction is, however, useful for such longitudinal wave generaiton. As will be seen, alternate rotors turn in opposite directions, so that lateral components or thrust are cancelled, while owing to the fact that the rotors move vertically in unison, vertical or longitudinal components of thrust are additive. The turbine driven wave generator accordingly comprises a simple but powerful device for producing a longitudinally or vertically directed alternating force, with no unbalanced lateral force components. The device comprises essentially a series of longitudinally reciprocating inertia weight elements which oscillate along a vertical or longitudinal direction line with simple harmonic motion, and which exert an alternating force on their respective mounting shafts, and thence on the housing 35 along the longitudinal direction line in accordance with the vertical component of acceleration and deceleration.

The resulting reaction in the housing 35 is a vertically directed cyclic or alternating force of great magnitude, which is transmitted to the turbine casing, and thence to the mounting flange 28, the adapter or coupling sleeve 12 and the upper end portion of the pile. The parts between the wave generator housing and the pile will be seen to afford a stiff or rigid coupling therebetween.

The wave generator as described, when coupled to the pile, is characterized by high acoustic output impedance, by which expression is denoted a high ratio of cyclic force to cyclic displacement velocity. This high output impedance is necessary to activate the pile into high amplitude standing wave vibration, since the acoustic impedance of the pile, at its drive point (upper end), is inherently high. In other words, each end of the pile, when undergoing standing wave vibration, and especially when the lower end is firmly engaged with the earth, has a high acoustic impedance, i.e., a high ratio of cyclic force to displacement velocity. To drive this pile so as to set up an effective and necessarily powerful standing wave therein, the wave generator must be stiffly coupled thereto, and possess inherently a comparably high acoustic output impedance. The generator herein shown possesses such characteristics. It is of interest to note that the illustrative wave generator secures such characteristics, in part, by use of a drive turbine which turns at relatively high velocity but low force, and is therefore a low impedance device, and by use of a type of transducer between this turbine and the point of force application to the pile which correlatively reduces velocity and increases force, at the same time converting the rotation of the turbine to reciprocation at the output of the wave generator. It will be seen that the rotating inertia weights exert, through their shafts, a high alternating force output, appropriate to the driving of a high impedance load, such as is represented by the pile, associated mass, and the earth; and this high force output is applied to the wave generator housing, and thence to the high impedance upper end of the pile. At the coupling between the wave generator and pile, the cycle is characterized by low stroke amplitude and velocity, and high force, i.e., high impedance. In other words, the high impedance offered by the upper end of the pile is satisfied by the high force output (high output impedance) of the wave generator, and an effective drive is realized. The wave generator housing, together with the turbine and the pile itself, represent a large mass or inertia which must be cyclically driven by the alternating force output of the generator. This combined mass, however, coacts with the large elastic stiffness factor of the pile to create, when the wave generator is operated at resonant frequency, a resonant standing wave system wherein the high inertia reactance is "tuned out" or balanced by the high elasticity reactance, and the resistive component of the impedance of the earth is thus reflected up to the output of the wave generator by this tuning. The pile can thus be readily set into powerful high amplitude standing wave vibration, easily approaching the elastic limit of the pile. It is of course necessary that the power used shall not be sufficient to exceed the elastic limit of the pile, as the pile would then be disrupted.

In operation, liquid, preferably water, is taken from tank T on vehicle A via hose 130 to centrifugal pump 131, and delivered from the latter via hose 78 into turbine case 24. Pump 131 is shown as driven from a torque responsive internal combustion E, mounted on the vehicle. The liquid passes downwardly through the turbine stator and rotor units, rotating the turbine rotor shaft, and is returned to tank T via hose 79b. In passing, it may be mentioned that the static back pressure within the upper portion of the turbine housing will be greater than that at a distance below liquid inlet port 51, for example, at the location of seal 76, with the result that telescopic chamber member 66 is under a small pressure differential, and exerts a small pressure on the oil body contained therein, contributing a tendency for leakage of oil outwardly of the oil system, in preference to leakage of water into the oil system.

The rotating turbine shaft rotates the wave generator drive shaft 88, and through the described gearing, rotates the unbalanced rotors 114. As previously set forth, this creates synchronized alternating vertically oriented forces applied to the rotor shafts, which are resisted by the high impedance system made up of vibrator housing, turbine, coupling 12, and the resonant pile in its environment. These parts accordingly move through short displacement distance, at relatively low velocity, but with very great force, satisfying the above described impedance adjustment necessary to effective drive of the pile.

The longitudinal alternating force, so applied to the upper end of the pile, sends alternating high amplitude elastic waves of compression and tension travelling along the length of the pile, and if the frequency of the alternating force is in the range of a resonant frequency of the pile, a resonant longitudinal standing wave is set up therein with consequent build up of vibration amplitude. Before the pile is engaged with the earth, it acts as a "free-free" bar, with velocity antinodes at the ends, and a pressure antinode at the midpoint (for fundamental resonance). The spring suspension device 14 from which the wave generator and pile is hung has low stiffness, and is hence a low impedance device, acting effectively to prevent transmission of wave energy in an upward direction. Actually, in practice, the wave motor-generator 13 and adapter or coupling sleeve 12, being stiffly or rigidly coupled to the pile, and being also capable of longitudinal elastic deformation, become a part of an elastically vibratory column system. The upper velocity antinode, rigorously speaking, is accordingly located within the motor-generator, the lower velocity antinode is at the lower end of the pile, and the pressure antinode is located between the velocity antinodes. Under these conditions, the two half lengths of the pile alternately elastically elongate and contract, in step with one another, the cumulative amplitude of the elastic deformation, measured from the nodal midpoint of the pile, progressively increasing toward each end.

The system as described automatically seeks and operates at the resonant frequency of the pile. Any carburetor type internal combustion engine, such as is here used to drive the pump which supplies the liquid to the turbine, has inherent torque responsive characteristics.

I will now describe one manner of operation according to the invention. Initially, the engine is throttled to a speed such that the wave generator operates at a frequency to establish a resonant standing wave in the pile. This is readily accomplished by observing the vibratory behavior of the pile. This preliminary situation is illustrated in the diagram of Fig. 10.

The pile is then lowered into firm engagement with the earth, and its weight caused to rest on the earth. The lower end of the pile then forcibly impacts on the soil, causing it to give way, and to permit penetration as the pile is gradually lowered by paying out on cable 18. Once the pile is thus engaged with the earth, and partially embedded therein, it becomes "conscious" of the acoustic impedance to vibratory action offered by the earth structure. In particular, it becomes conscious of the resistive component of the acoustic impedance of the earth. This causes the amplitude and velocity of cyclic motion at the lower end portion of the pile to be reduced somewhat. The lower end of the pile no longer experiences a true or pure velocity antinode, but exhibits a certain degree of pressure or stress cycle. The pressure antinode at the midsection of the pile lowers somewhat, as represented in Fig. 11, meaning a lower resonant frequency. Because work is now being done by the system, the torque on the engine increases; moreover, the work done will be maximized at the resonant frequency, at which vibration amplitude is maximized. The torque responsive engine, at fixed throttle, now responds automatically to the maximum torque condition by slowing down just sufficiently so as to drive the wave generator at the reduced resonant frequency of the partially embedded pile. Stroke amplitude can be built up, if desirable, by opening the engine throttle further.

Fig. 12 illustrates a subsequent stage, with the pile embedded deeper, and the pressure antinode moved further downward. Vibration amplitude and velocity in the lower portion of the pile is further reduced, and the magnitude of the pressure cycle correspondingly increased. By reason of increased acoustic impedance now offered by the earth, the driving engine now delivers higher torque, at a speed reduced sufficiently to drive the wave generator at the now further reduced resonant frequency of the pile.

Eventually, as the pile goes deeper, the maximum impedance which the earth can offer to the pile is attained, the pressure antinode will therefore no longer lower, and the engine operates to supply maximum torque, at the minimum resonant frequency that will be reached.

Beyond this stage, as the pile is driven still deeper, a condition represented in Fig. 13 is reached. Here, the pressure antinode is as low as it will travel. Here, also, a new phenomenon is represented, in that the distance between the velocity and pressure antinodes is now reduced, owing to the shortened above-ground length of the pile, and as shown, is even shorter than the original distance between pressure and velocity antinodes. The resonant frequency of the system is now higher than at the outset. The maximum torque condition is now satisfied by engine operation at an increased speed; i.e., increased sufficiently to drive the wave generator at the now increased resonant frequency of the pile; and the engine automatically responds to do this.

The internal combustion engine, operating at fixed throttle, is thus inherently and automatically self-governing when driving the resonant system to supply maximized torque at a speed corresponding always with the resonant frequency of the system. Some special engine may not be torque "conscious" to this extent. For example, a diesel engine, having a cam driven fuel injector, has a somewhat flat speed response curve. In an alternative method of operation, using an engine of this type, manual throttle control is relied on to regulate the speed of the engine to follow the resonant frequency of the pile as this frequency first decreases and then increases, as described in the foregoing.

The operating frequency range of the generator may be given in terms of $c$ and $L$, where $c$ is the speed of sound in the material of the pile, and $L$ is the equivalent length of the pile (pile length plus generator length). For the initial situation with the pile hanging free, as a "free-free" bar, as in Fig. 10, the resonant frequency is equal to $c/2L$. In Fig. 12, where the pile is buried a substantial distance, the resonant frequency drops, and approaches $c/4L$ as a lower limit. In the final situation, Fig. 13, the resonant frequency has increased, and may even exceed $c/2L$. A resonant frequency represented by $c/4L$ is thus the lower limiting case.

In the operation of the pile driving system of the invention, the pile, vibrating strongly in a standing wave mode, functions as an energy reservoir, somewhat as a flywheel. Energy is alternately stored and delivered. The pile has considerable alternately accelerated and decelerated mass, and considerable restoration force when elastically deformed. In terms of acoustics, it has considerable mass reactance, and considerable elastic stiffness reactance. These factors are dynamically balanced against one another when the system is in standing wave action, and considerable energy is stored in and delivered from the pile during each cycle. It will be seen that the mass reactance of the pile does not, in this system, serve to inhibit force transmittal through the pile to the earth, but cooperates with the elastic stiffness reactance to furnish an energy storage system which alternately absorbs from the wave generator, and then delivers it forcibly as the pile impacts against the earth.

The wave action in the pile greatly reduces skin friction between the pile and the earth. It also has a unique advantage, in view of the phenomenon known as Poisson's ratio, in that as the lower section of the pile longitudinally elongates on each downward impact stroke, it correspondingly contracts in its transverse dimension. The pile is thus slightly cleared from the adjacent wall surface. It will be seen that this performance causes the pile to vibrate laterally against the walls of the surrounding earth. Since this vibration takes place at a frequency to which earth material does not readily respond, the earth wall, in effect, "stands back," reducing wall friction, and facilitating the stroke.

It has been mentioned that the pile driving system of the invention may employ a lateral mode standing wave. In this case, velocity antinodes tend to appear in the end locations as before, but the wave is transverse to the pile, rather than longitudinally thereof. This type of wave may be excited by a modification of the system as shown in Fig. 7, all other components remaining as before.

In Fig. 7, which corresponds to a portion of Fig. 3, components similar to those of Fig. 3 have like reference numerals. Successive unbalanced rotors 114a of the wave generator in this case are arranged in 180° opposition, or at 180° phase difference, as shown. Accordingly, all components of thrust in the vertical direction are cancelled. However, all unbalanced rotors swing in lateral directions in unison. Accordingly, the lateral thrusts are additive, and the generator applies an alternating force to the upper end of the pile which is oriented transversely of the pile. The system in this case is entirely analogous to that heretofore described, excepting for the lateral orientation of the direction of vibration. This laterally oriented vibration has a loosening effect on the soil owing to the transverse motion of its bottom face, permitting the pile to embed itself rapidly therein, particularly in unstable soils.

Fig. 8 shows a further modification of the generator, designed to give a torsional mode of vibration along with longitudinal vibration. In this case, the unbalanced rotors 114b of the generator are all related so as to swing up and down in unison, thus giving additive force components in the vertical direction, and a neutralization of force components in the lateral direction.

In this case, however, the unbalanced weight portions of the rotors are located alternately on opposite sides of the longitudinal center line of the generator. As they swing out, accordingly, they produce a torque about this longitudinal center line. Arranged as illustrated, i.e., with successive rotors turning in opposite directions, these torque thrusts are additive; and a resultant torque, first in one direction, and then the other, is exerted on the generator housing. This torque is transmitted from the generator housing to the upper end of the pile. To utilize the torsional mode of vibration, it is necessary that the wave generator be driven at a frequency corresponding with the torsional resonant frequency of the pile, which will, in general, differ materially from the longitudinal resonant frequency. Accordingly, by driving the wave generator at the resonant frequency for a torsional standing wave, the principal wave action of the pile will be in the torsional mode. Then, if it should be desired to shift to longitudinal wave action, it is merely necessary to shift the frequency of the wave generator to the resonant frequency for longitudinal vibration, which will subdue the torsional mode, and bring about principally a longitudinal wave action.

In Fig. 9 I have shown an application of the invention to driving of piles in an underwater situation. I have also indicated in Fig. 9 a tubular type of pile 10a, which will be understood to be clamped directly to the wave generator, the adapter sleeve of the first embodiment being omitted. That is to say, the tubular pile engages into the clamp device shown in detail in Fig. 3, engaging upwardly against the flange 28, and being gripped by the wedge slips 30. The motor-generator, again indicating by reference numeral 13, is supported through spring suspension 14 from blocks carried by crane 17, which is in this case supported by barge 140 floating on water 141. Water feed hose 78a leads from pump 142 driven by engine 143 located on the barge, and the pump is fed by hose 144 reaching down into the water. Return hose 145 discharges outside the barge, as shown.

It will be understood that the drawings and description are merely illustrative of and not restrictive on the nature and scope of the invention, and show merely illustrative embodiments thereof. The appended claims are accordingly to be construed as covering various changes in design, structure and arrangement such as may be resorted to by those skilled in the art.

I claim:

1. The method of installing an elastic foundation pile in tight engagement with the surrounding earth, that comprises: coupling to said pile an acoustic wave generator whose output impedance is of the order of that of the pile with the pile in tight engagement with the earth, in such manner as to constitute thereof an elastically vibratory column system, maintaining the pile in engagement with the earth, and operating said generator at a frequency to establish in said column system an acoustic resonant standing wave, said frequency being no less than $c/4L$, where L is the equivalent length of said elastically vibratory column system and c is the speed of transmission of elastic vibration in said system.

2. The method of claim 1, using an acoustic wave generator capable of generating longitudinal elastic waves in the pile, whereby to establish a longitudinal resonant standing wave in said column system.

3. The method of claim 1, using an acoustic wave generator capable of generating lateral elastic waves in the pile, whereby to establish a lateral resonant standing wave in said column system.

4. The method of claim 1, using an acoustic wave generator capable of generating torsional elastic waves in the pile, whereby to establish a torsional resonant standing wave in said column system.

5. The method of claim 1, wherein a biasing force is brought to bear on the pile in the direction of intended pile movement.

6. The method of claim 1, wherein said frequency is made such as to establish a plurality of velocity antinodes along the pile.

7. The method of claim 1, including the step of increasing the power output of said generator and thereby the amplitude of vibration of said system as the pile moves through the earth.

8. The method of driving a foundation pile in tight engagement in the surrounding earth by elastic column vibration that comprises: coupling to said pile the vibratory output means of an acoustic wave generator whose output impedance is of the order of that of the pile in tight engagement with the earth, establishing a bias force urging said pile in the desired direction, and operating said generator at a frequency to establish elastic resonant vibration in the elastically vibratory column system constituted by said generator and pile together with any elastically vibratory equipment coupled thereto, said frequency being no less than $c/4L$, where L is the equivalent length of said elastically vibratory column system and c is the speed of transmission of elastic vibration in said system.

9. The method of claim 8, wherein said bias force is in the direction to extract the pile from the earth.

10. The method of claim 8, wherein said bias force is in the direction of penetration of said pile into the earth.

11. The method of claim 8, wherein earth in the region of said pile is in contact with a liquid body.

12. The method of claim 8, using an elastic coupling column between said generator and said pile transmitting drive from said generator to said pile.

13. The method of claim 8, including the use of a low impedance suspension connected to said elastically vibratory system to prevent transmission of vibratory energy therefrom.

References Cited in the file of this patent

UNITED STATES PATENTS

| | | |
|---|---|---|
| 1,957,999 | Goldsborough | May 8, 1934 |
| 2,717,763 | Bodine | Sept. 13, 1955 |
| 2,743,585 | Berthet | May 1, 1956 |
| 2,844,007 | Morehead | July 22, 1958 |

FOREIGN PATENTS

| | | |
|---|---|---|
| 387,473 | Great Britain | Feb. 9, 1933 |

OTHER REFERENCES

Vibration Testing of Friction Piles, Dodge and Swiger, Engineering News Record Reprint, McGraw-Hill Pub. Co., Inc., May 13, 1948 (vol., pp. 716–720), pp. 84–88.